United States Patent [19]
Osborne et al.

[11] 3,760,730
[45] Sept. 25, 1973

[54] ROCKET VEHICLE

[75] Inventors: Donald W. Osborne, Brigham City, Stanley V. Peterson, Ogden, both of Utah

[73] Assignee: Thiokol Chemical Corporation, Bristol, Pa.

[22] Filed: Mar. 6, 1972

[21] Appl. No.: 232,052

[52] U.S. Cl............................... 102/49.4, 244/1 SS
[51] Int. Cl............................................ F42b 15/10
[58] Field of Search................. 244/1 R, 1 SS, 1 SB, 244/1 SD; 102/49.4, 34.4, 35.6, 37.6, 69

[56] References Cited
UNITED STATES PATENTS

| | | |
|---|---|---|
| 2,804,823 | 9/1957 | Jablansky............................ 102/49.4 |
| 3,116,895 | 1/1964 | Mitchum, Jr........................ 244/1 SS |
| 3,491,692 | 1/1970 | Blankenagel........................ 102/49.4 |

*Primary Examiner*—Milton Buchler
*Assistant Examiner*—Jesus D. Sotelo
*Attorney*—Edward E. McCullough

[57] ABSTRACT

A rocket motor has a plurality of peripheral, canted, thrust nozzles and an aftwardly extending coupling member. A thermally operated time delay device in communication with the interior of the rocket motor, and operatively connected to a latch means that locks the rocket to a cargo carrying case, is capable of releasing the latch means and separating the rocket from the cargo at a predetermined instant in time.

6 Claims, 3 Drawing Figures

PATENTED SEP 25 1973 3,760,730

ROCKET VEHICLE

BACKGROUND OF THE INVENTION

This invention relates generally to rocket vehicles, especially to rocket vehicles intended for launching various types of cargo into the atmosphere. The invention described herein was made in the course of or under a contract with the U. S. Army.

Rockets for launching cargoes such as illuminating flares, cloud seeding chemicals, or chaff into the atmosphere have been known in the prior art. However, the conventional rocket for accomplishing these purposes has been a push type of arrangement wherein the cargo is mounted forwardly of the rocket. At the appropriate moment, the rocket is separated from the cargo by various devices such as explosive bolts. A number of difficulties have been experienced with this type of rocket vehicle. For example, in order to achieve aerodynamic stability in such vehicles, a ballast filled nose cone was cutomarily attached to the forward end of the cargo to insure that the center of mass of the system would remain forward of the center of atmospheric pressure thereof. This increased weight of inert parts automatically enlarged the size of the rocket and, hence, increased both the bulk and cost of such a vehicle to considerable extent. Also there was a very real possibility that the rocket would collide with its cargo after separation.

SUMMARY OF THE INVENTION

The present invention, which overcomes these difficulties of the prior art, includes a rocket having an aft closure with a plurality of peripheral, outwardly canted, thrust nozzles. An aftwardly extending, open ended housing is formed in part by the aft closure and the nozzles. A time delay device in communication with the interior of the rocket motor is operatively connected to a latch means that normally locks the aft end of the housing to a cargo case. The time delay device essentially comprises a hollow cylinder having one closed end, the open end being engaged in a hole in the aft closure of the rocket motor. A piston in the cylinder has an actuation arm extending through a central hole in the closed end of the cylinder; a compression spring is confined between the piston and the closed end of the cylinder; and a slow burning propellant grain, or other consumable material, bonded into the cylinder, extends from the piston to the open end of the cylinder.

The latch means consists of a channel plate having short, inwardly extending flanges, that confine two diametrically extending pawls for sliding motion on the channel plate. The pawls are spring biased toward one another and are normally kept in locked position in aligned holes through the aft end of the housing and the cargo case by the actuation arm, that extends between the pawls and through a central hole in the channel plate.

In this arrangement, the relatively heavy rocket motor is always in front of the cargo, so that the center of mass of the system is always forward of the center of aerodynamic pressure of the system. Hence, additional ballast is not necessary for stabilization of the vehicle, and a smaller, less expensive rocket motor may be used to launch any given cargo.

Objects of the invention are to provide a rocket vehicle for launching various types of cargoes into the atmosphere wherein additions of ballasts and nose cones are unnecessary; and to provide such a vehicle having time delay means that can be precisely controlled and that will function over a long period of time. Another object of the invention is to provide a rocket vehicle wherein the rocket motor cannot strike the payload after a separation thereof. Important features of the invention are that the fixed nozzles of the rocket motor can easily be formed to provide spin stabilization for the system, if desired, and that the system is relatively uncomplicated and reliable over long periods of storage.

Other objects and advantages of the invention may be noted as the following description is read with reference to the accompanying drawings wherein the same parts are designated by the same numerals throughout the disclosure.

DESCRIPTION OF THE PREFERRED EMBODIMENTS

Figure 1:
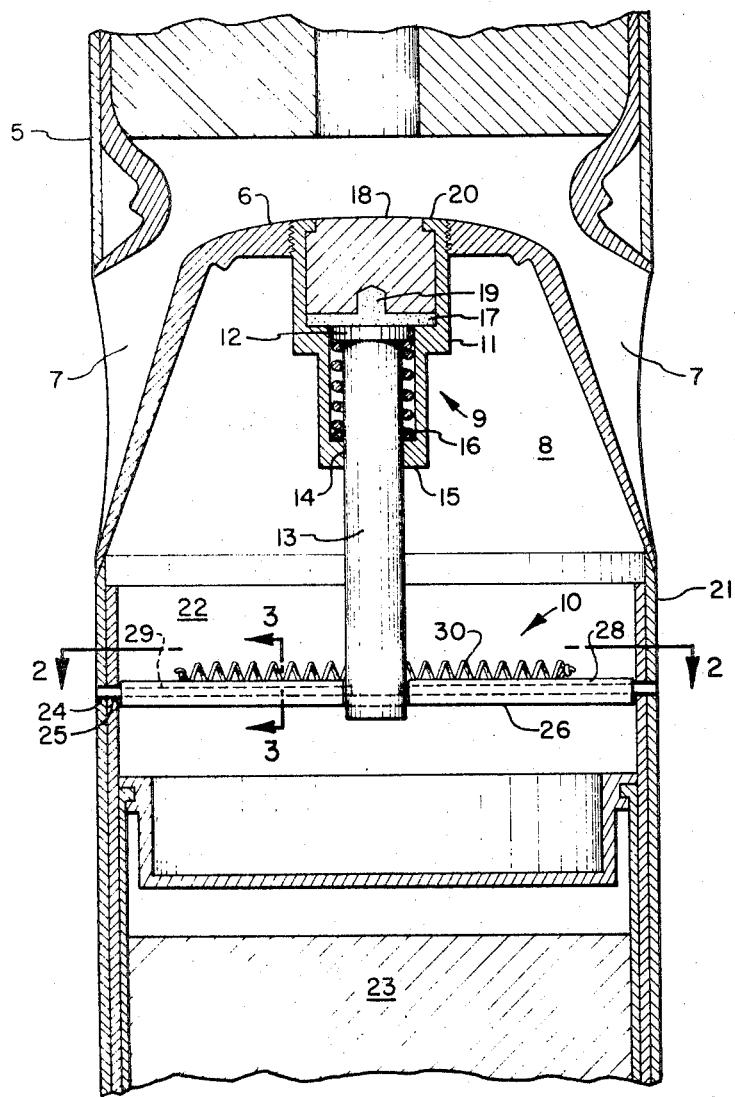
FIG. 1 is a longitudinal, fragmentary section of the juncture between a rocket motor and its cargo to illustrate the novel features of the invention.
Figure 2:
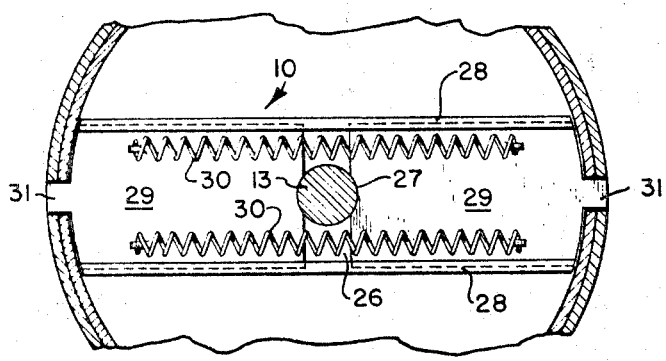
FIG. 2 is a cross-sectional view taken on line 2 — 2 of FIG. 1 to show the latching mechanism.
Figure 3:
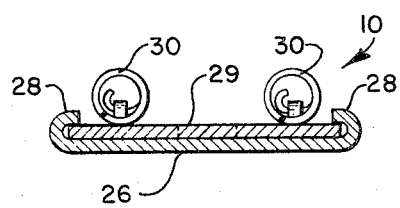
FIG. 3 is a section taken on line 3 — 3 of FIG. 1 to show the relationship of the spring biased pawls to the channel plate support therefor.

As shown in FIG. 1, a rocket motor 5 has an aft closure 6 with a plurality of peripheral, outwardly canted, thrust nozzles 7. An aftwardly extending housing 8, having the approximate shape of a truncated cone, is open at its aft end and is partially formed by the nozzles 7 and the aft closure 6. A time delay device 9 is in communication with the interior of the rocket motor 5 and is operatively connected to a latch means 10.

The time delay device 9 has a hollow cylinder 11 that is open at one end and closed at the other. A piston 12 has an actuation arm 13 that extends through a central hole 14 in the closed end 15 of the cylinder 11. A compression spring 16 surrounds the actuation arm 13 and is confined between the piston 12 and the closed end 15 of the cylinder in a normally compressed position. A small amount of explosive material 17 is adjacent the piston 12, and the remainder of the hollow cylinder from the explosive 12 to the open end thereof is filled with a slow burning, rocket propellant 18, or other consumable material. The explosive charge 17 has a small tongue 19 that extends a short distance into the propellant 18. The propellant charge 18 is bonded into the cylinder 11 and is further retained therein by an annular, inwardly extending flange 20 on the open end of the cylinder 11.

The aft end portion 21 of the housing 8 is cylindrical and is made to telescope with the case 22 for the cargo 23. Diametrically opposite, alignable holes in the aft end 21 of the housing and the case 22 for the cargo are used to lock the rocket motor 5 to the cargo case 22. These holes are numbered 24 and 25. Hence, the housing 8 functions also as a coupling member for attaching the rocket motor to the cargo case.

The latch means 10 includes a channel plate 26 having a central hole 27 therein and short, inwardly extending flanges 28 that extend the length thereof. A pair of diametrically extending pawls 29 are confined for sliding motion on the channel plate by the flanges 28. These pawls 29 are spring biased toward each other by a pair of tension springs 30, one end of each spring being attached to one pawl and the other end of each spring being attached to the other. The rocket motor 5 is attached to the case 22 of the cargo 23 by extending the outer ends 31 of the pawls 29 through the aligned holes 24 and 25 in the aft end 21 of the housing and the cargo case 22. The pawls 29 are normally maintained in this extended position by the actuation arm 13 of the time delay device 9, which extends between the pawls 29 and through the central hole 27 in the channel plate 26.

As the propellant 18 is consumed by the heat of the rocket motor 5, the flame front thereof proceeds toward the tongue 19 of the explosive charge 17 and, by explosively removing this last detent to the piston 12, the compression spring 16 is allowed to move the piston and withdraw the actuation arm 13 from the latch means 10. This allows the pawls 29 to move toward one another, automatically withdrawing from the holes 24 and 25 in the housing of the rocket motor and the cargo case and separating the rocket 5 from the cargo 23.

An invention has been described that advances the art of launching devices into the atmosphere by rocket. Although the preferred embodiment has been described with considerable specificity regarding detail, it should be noted that such details may be altered without departing from the scope of the invention as it is defined in the following claims.

The invention claimed is:

1. A rocket vehicle for launching cargo contained in a cylindrical case, comprising:
   a rocket motor having a plurality of peripheral, outwardly canted, thrust nozzles;
   an aftwardly extending, coupling member fixed to the aft end of the rocket motor and shaped for telescoping, sliding engagement with the cylindrical cargo case, having holes that are alignable with holes on the cargo case;
   latch means that extend, against spring bias, through said alignable holes to lock the rocket vehicle to the cargo case; and
   a thermally operated, time delay device, containing consumable material in communication with the interior of the rocket motor that is operatively connected to the latch means to maintain it in locked position against the spring bias thereof, whereby removal of the consumable material by heat of the rocket operates to release the latch and permit separation of the rocket vehicle from the cargo.

2. The rocket vehicle of claim 1 wherein the coupling member is an aftwardly extending, open ended housing that is formed in part by the aft closure of the rocket and the nozzles thereof.

3. The rocket vehicle of claim 1 wherein the thermally operated delay device comprises a hollow cylinder open at one end and closed at the other; a piston in the cylinder having an actuation arm extending through a central hole in the closed end of the cylinder; a compression spring normally compressed and confined between the closed end of the cylinder and the piston; and slow burning, solid propellant filling the cylinder from the piston to the open end thereof and being bonded thereto so that the piston cannot move until the propellant is consumed, the open end of the cylinder being fixed in a hole in the aft closure of the rocket motor so that the propellant in the cylinder is exposed to the interior of the rocket motor—the actuation arm being normally in contact with the latch means to maintain it, against spring bias, in the aligned holes of the coupling member and the cargo case, whereby consumption of the propellant permits withdrawal of the actuation arm from the latch means and release of the latter from the aligned holes.

4. The rocket vehicle of claim 3 wherein the latch means comprises a channel plate having a central hole and short, inwardly extending flanges; a pair of diametrically extending pawls confined for sliding motion on the channel plate by the flanges thereof, the out end portions of the pawls being capable of fitting into diametrically opposite, aligned holes in the coupling member and the cargo case; and spring means biasing the pawls toward each other—the actuation arm of the piston extending between the pawls and through the central hole of the channel plate, whereby consumption of the propellant in the cylinder allows the compression spring to move the piston and withdraw the actuation arm from between the pawls, whereby they may be withdrawn from the aligned holes in the coupling member and the cargo case to permit separation thereof.

5. The rocket vehicle of claim 3 further including an explosive charge interposed between the slow burning propellant and the piston in the delay device and having a tongue of explosive extending from the explosive charge into the slow burning propellant to serve as a precision means for release of the piston.

6. A rocket vehicle comprising:
   a solid propellant rocket motor having an aft closure with a plurality of peripheral, outwardly canted, thrust nozzles;
   an aftwardly extending, open ended housing partially formed by the aft closure and the thrust nozzles;
   a thermally operated time delay device comprising a hollow cylinder open at one end and closed at the other; a piston in the cylinder having an actuation arm that extends through a central hole in the closed end of the cylinder; a normally compressed compression spring confined in the cylinder between the piston and the closed end thereof; an explosive material in the cylinder adjacent the piston; and a relatively slow burning solid propellant bonded into the cylinder and filling it from the explosive material to the open end thereof—the open end portion of the cylinder being threadedly engaged in a central hole in the aft closure of the rocket motor so that is it exposed to the interior thereof; and
   a latch means comprising a channel plate having a central hole therein and short, inwardly extending flanges; a pair of radially extending pawls confined for sliding motion on the channel plate by the short flanges and capable of locking the rocket vehicle to a cylindrical cargo case by extending into diametrically opposite, aligned holes in the aftwardly extending housing and the cargo case; and spring means biasing the pawls toward each other—the pawls being normally locked into their extended positions through the aligned holes in the rocket and cargo case by the actuation arm of the time delay mechanism, which extends between the pawls and through the central hole of the channel plate, the pawls being released from the aligned holes by consumption of the slow burning propellant and the explosive charge in the delay device, which permits the compression spring to move the piston and withdraw the actuation arm from between the pawls.

* * * * *